US006565145B2

(12) United States Patent
Pettey

(10) Patent No.: US 6,565,145 B2
(45) Date of Patent: May 20, 2003

(54) ADJUSTABLE AUTOMOTIVE AIRFOIL

(75) Inventor: Brian Pettey, Winfield, KS (US)

(73) Assignee: BTR Robotic Limited, Winfield, KS (US)

( * ) Notice: Subject to any disclaimer, the term of this patent is extended or adjusted under 35 U.S.C. 154(b) by 0 days.

(21) Appl. No.: 09/727,611

(22) Filed: Dec. 1, 2000

(65) Prior Publication Data

US 2002/0067049 A1 Jun. 6, 2002

(51) Int. Cl.$^7$ .............. B60J 1/20; B60J 9/04; B62D 35/00; B62D 37/102
(52) U.S. Cl. .............. 296/180.5; 276/180.1; 180/903
(58) Field of Search ............ 296/180.1, 180.5; 180/903; 188/2 R

(56) References Cited

U.S. PATENT DOCUMENTS

| | | | |
|---|---|---|---|
| 2,979,165 A | 4/1961 | McCambridge | 188/87 |
| 3,058,702 A | 10/1962 | Sharples et al. | 244/110 |
| 3,216,536 A | 11/1965 | Henschel | 188/90 |
| 3,610,577 A | 10/1971 | Fellers | 244/113 |
| 3,791,468 A | 2/1974 | Bryan, Jr. | 180/1 FV |
| 4,156,543 A | * 5/1979 | Taylor et al. | 296/180.3 |
| 4,160,494 A | 7/1979 | McCambridge | 188/270 |
| 4,611,796 A | 9/1986 | Orr | 296/1 S |
| 4,629,240 A | * 12/1986 | Dornier | 180/903 |
| 4,693,506 A | 9/1987 | Massengill | 296/1 S |
| 5,092,648 A | 3/1992 | Spears | 296/180.3 |
| 5,429,411 A | 7/1995 | Spears | 296/180.1 |
| 5,454,619 A | 10/1995 | Haraway | 296/180.1 |
| 5,522,637 A | 6/1996 | Spears | 296/180.3 |
| 5,607,199 A | 3/1997 | Gill | 296/180.1 |
| 5,688,020 A | 11/1997 | Burg | 296/180.1 |
| 6,099,069 A | 8/2000 | Spears | 296/180.2 |

FOREIGN PATENT DOCUMENTS

| | | | | |
|---|---|---|---|---|
| DE | 2942142 | * | 4/1981 | 296/180.5 |
| EP | 0153743 | * | 9/1985 | 296/180.5 |
| JP | 0092993 | * | 5/1985 | 296/180.5 |
| JP | 0207777 | * | 8/1988 | 296/180.1 |

* cited by examiner

Primary Examiner—Stephen T. Gordon
Assistant Examiner—Hilary Gutman
(74) Attorney, Agent, or Firm—Christopher L. Holt; Westman, Champlin & Kelly, P.A.

(57) ABSTRACT

The present invention provides an adjustable airfoil mountable to a vehicle and movable from a first position to a second position. The invention further includes an actuator device coupled to the adjustable airfoil to selectively move the airfoil from the first position to the second position and operatively coupled to a vehicle brake system so that the actuator device is able to receive a signal pertaining to operation of the vehicle brake system, wherein the actuator device moves the adjustable airfoil as a function of the signal. In an embodiment of the present invention, the adjustable airfoil further comprises a remote control device operably coupled to the actuator to provided a second signal, wherein the actuator device also moves the adjustable airfoil as a function of the second signal. In another embodiment, a method is disclosed for operating an adjustable airfoil as just described.

7 Claims, 8 Drawing Sheets

FIG. 2
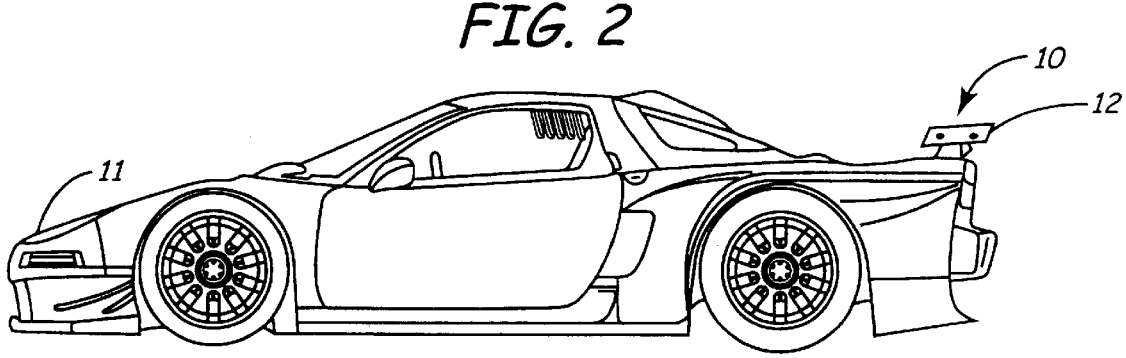
FIG. 3
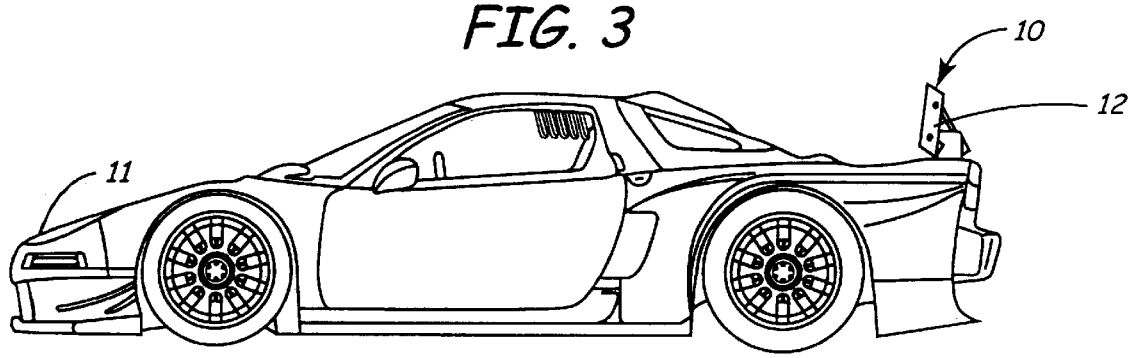
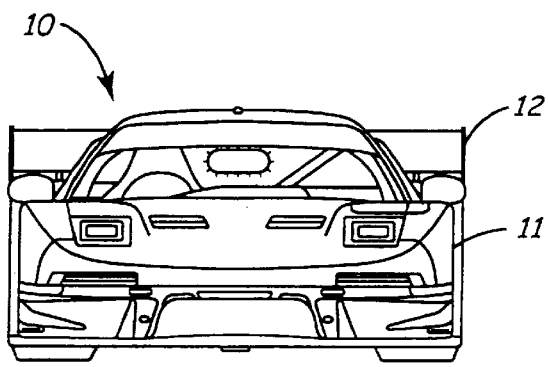
FIG. 4
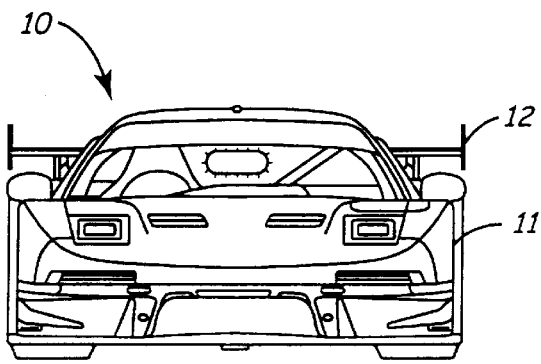
FIG. 5

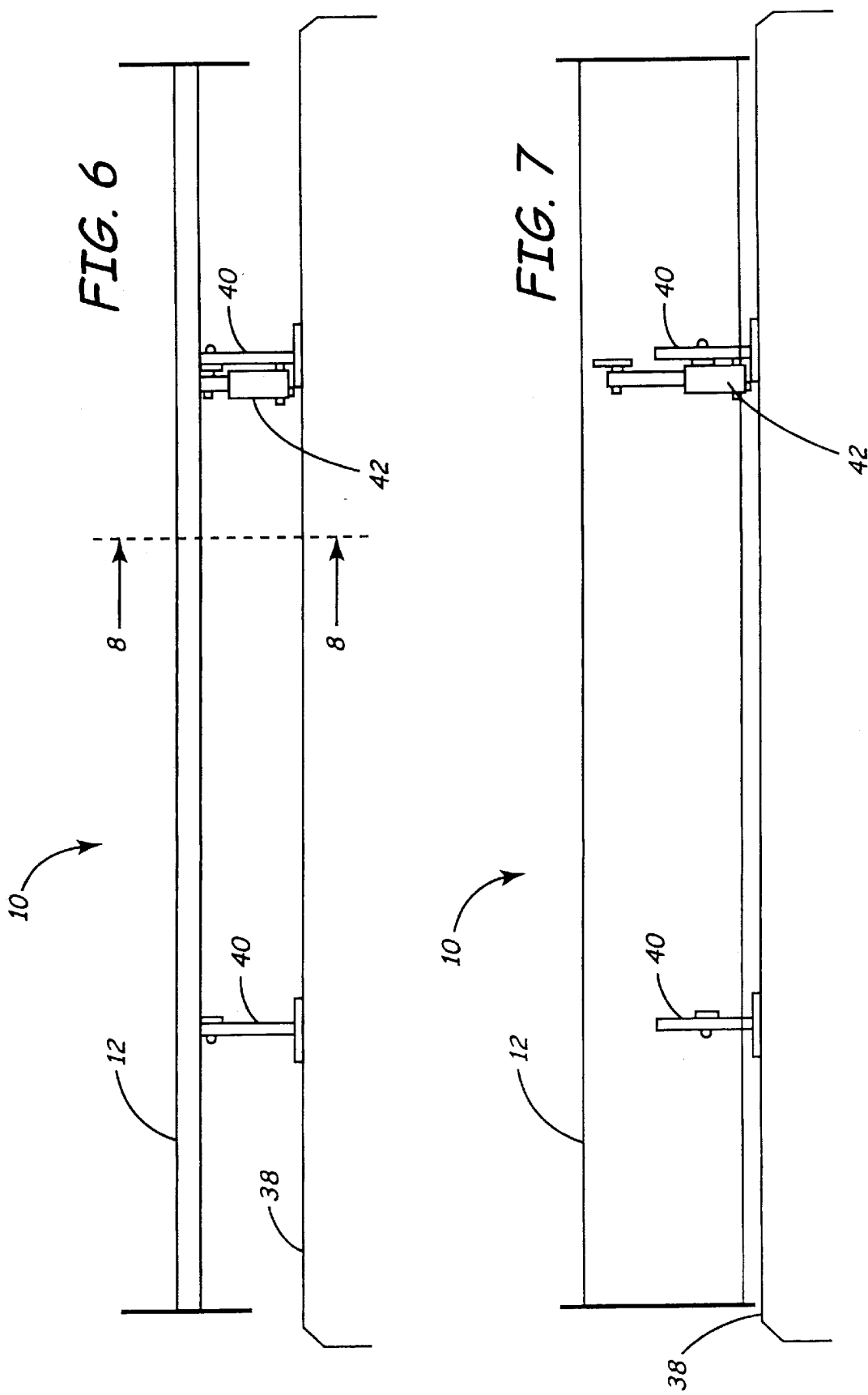

ADJUSTABLE AUTOMOTIVE AIRFOIL

BACKGROUND OF THE INVENTION

The present invention relates generally to after-market automobile accessories. More particularly, the present invention relates to an automotive after-market wing or airfoil.

Various types of automobile-accessories are available on the market for purchase and installation onto an automobile. Among these accessories are fixed rear spoilers designed to attach to the back portion of a car, most typically to the trunk. Many of the fixed spoilers on the market are designed with appearance and styling in mind and produce no aerodynamic benefits whatsoever. However, some spoilers on the market are designed specifically with aerodynamics in mind. Most commonly, spoilers of this type are set at a single unadjustable angle selected by the spoiler manufacturer. Purchasers of these types of spoilers must make a determination as to what aerodynamic characteristics are the most desirable and choose a particular spoiler accordingly.

For many consumers, choosing among the different spoilers with pitch angles selected by the manufacturer may be difficult. Cars that most often are driven down straight stretches of roadway will be more efficiently equipped with a spoiler having a low pitch (more parallel to the ground) than with a spoiler having a higher pitch (more toward a vertical alignment). A lower pitched spoiler is a more efficient choice for cars driven primarily on straight roadways because a spoiler with a low pitch will create a smaller downward aerodynamic force perpendicular to the roadway. A low pitch spoiler alignment promotes an efficient fuel economy and enables a vehicle to travel at a higher rate of speed. Conversely, it is more beneficial to choose a high-pitched spoiler for a vehicle that will be traveling through more curves than straight-aways. This is true because a spoiler with a high pitch creates a larger downward aerodynamic force perpendicular to the roadway. The large downward force equates to an increase in the frictional force between the tires of the vehicle and the roadway. Accordingly, a high pitch spoiler alignment increases a vehicle's control through curves. As a result of an increase in the amount of energy required to overcome the increased frictional force, however, fuel is burned less efficiently and maximum vehicle speed may be compromised.

A few spoilers available on the market enable the purchaser of the spoiler to choose and set the spoiler pitch angle. Typically these spoilers contain mechanical devices, such as setscrews, that enable the spoiler owner to choose a desired pitch angle from a limited range of potential angles. In many cases, the range of potential angles is quite limited. In all cases, adjustment of the pitch angle of the spoiler requires stopping the vehicle, getting out of the car and manually adjusting the mechanics to reset the spoiler to an alternate desired pitch angle.

SUMMARY OF THE INVENTION

The present invention provides an adjustable airfoil mountable to a vehicle and movable from a first position to a second position. The invention further includes an actuator device coupled to the adjustable airfoil to selectively move the airfoil from the first position to the second position and operatively coupled to a vehicle brake system so that the actuator device is able to receive a signal pertaining to operation of the vehicle brake system, wherein the actuator device moves the adjustable airfoil as a function of the signal.

In an embodiment of the present invention, the adjustable airfoil further comprises a remote control device operably coupled to the actuator to provided a second signal, wherein the actuator device also moves the adjustable airfoil as a function of the second signal.

In another embodiment of the present invention, a method is disclosed for operating an adjustable airfoil as just described.

BRIEF DESCRIPTION OF THE DRAWINGS

FIG. 2 is a side elevational view of a vehicle with the adjustable airfoil adjusted to a spoiler pitch angle position.

FIG. 3 is a side elevational view of the vehicle with the adjustable airfoil adjusted to an air brake pitch angle position.

FIG. 4 is a front elevational view of the vehicle with the adjustable airfoil adjusted to an air brake pitch angle position.

FIG. 5 is a front elevational view of the vehicle with the adjustable airfoil adjusted to a spoiler pitch angle position.

FIG. 6 is a rear elevational view of the adjustable airfoil attached to the vehicle and adjusted to the spoiler pitch angle position.

FIG. 7 is a rear elevational view of the adjustable airfoil attached to the vehicle and adjusted to the air brake pitch angle position.

DETAILED DESCRIPTION OF THE ILLUSTRATIVE EMBODIMENTS

Figure 1:
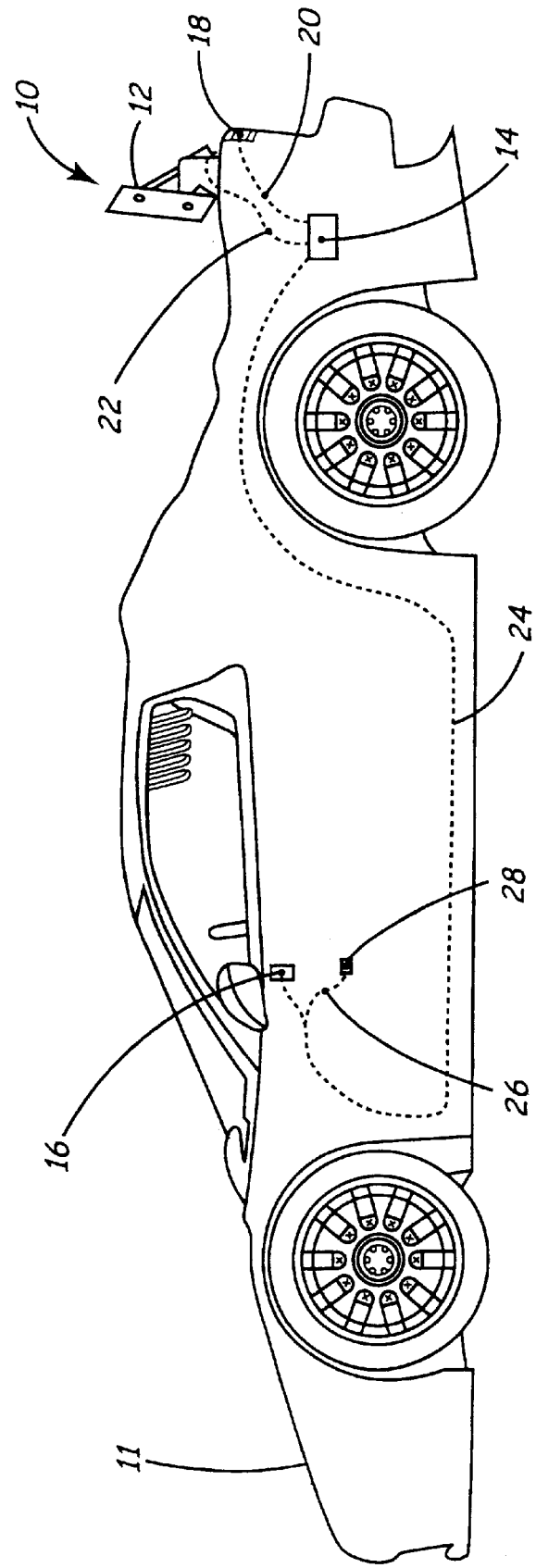
FIG. 1 is a schematic side view of a vehicle that includes an adjustable airfoil system in accordance with an embodiment of the present invention.

An embodiment of an adjustable airfoil system 10 of the present invention is illustrated in FIG. 1. In this embodiment, airfoil system 10 includes an adjustable airfoil 12, device controller 14 and remote control device 16. Device controller 14 is operatively connected to a brake light 18 by an electrical connection 20 so that device controller 14 is able to receive a signal pertaining to operation of the vehicle brake system. Device controller 14 is also operatively connected to remote control device 16 by an electrical connection 24 so that device controller 14 is able to receive a signal pertaining to manual adjustments initiated by a passenger of vehicle 11. In one embodiment of the present invention, manual adjustments made to remote control device 16 pertain to the selection of a spoiler pitch angle to be maintained by adjustable airfoil 12.

Device controller 14 and adjustable airfoil 12 are operably connected by electrical connection 22 so that adjustable airfoil 12 is able to receive instructions from device controller 14, based on signals received by device controller 14 from brake light 18 and from remote control device 16. Adjustable airfoil 12 utilizes an actuator, e.g. a motor, to respond to instructions from device controller 14 and to change configurations as a function of signals pertaining to operation of the vehicle brake system and as a function of signals pertaining to manual adjustments made to remote control device 16.

It should be noted that while device controller 14 is illustrated as being an independent device located in a rear portion of vehicle 11, other arrangements could be utilized without departing from the spirit of the present invention. For instance, device controller 14 could just as easily be mounted in the front or center portions of vehicle 11 or could be formed as an integral portion of adjustable airfoil 12.

In one embodiment of the present invention, electrical connection 20 is connected to wiring of brake light 18 in a known manner to receive a signal indicative of operation. For instance, the electrical connection can be formed in a manner similar to how the brake lights of a trailer are electrically connected to brake light wiring of a vehicle to enable operation of a trailer brake light to simultaneously correspond with operation of a vehicle brake light. In such a configuration, the device controller receives a signal in the form of an electrical current each time the connected vehicle brake light is activated. One purpose of the electrical signal is to communicate instances when further action is required, i.e. to change the configuration of the adjustable airfoil. The electrical signal can also be used as a power source to enable the further action, i.e. to power a motor that changes the configuration of the adjustable airfoil. While reference has been made to a connection to brake light 18, it should be noted that other connections to a vehicle brake system could be substituted to perform similar functions. For instance a connection could be made to a switch that monitors the operation of a brake pedal. This and other similar connections to a vehicle brake system should be considered within the scope of the current invention.

In embodiments of the present invention in which adjustable airfoil 12 receives electrical power from vehicle 11 only through means of an electrical connection with brake light 18, other means must be provided for adjustable airfoil 12 to change configurations at times when no electrical current is being provided to brake light 18 by vehicle 11. For example, in accordance with one embodiment of the present invention, brake light 18 receives a current from vehicle 11 upon an operation of the brakes of vehicle 11. Current is provided to adjustable airfoil 12 where it is utilized to power a motor that operates to change the configuration of adjustable airfoil 12. The motor changes the configuration of the adjustable airfoil from a spoiler pitch angle position, as is illustrated by FIGS. 2 and 5, to an airbrake pitch angle position, as is illustrated by FIGS. 3 and 4. It should be noted that in the current application, for the sake of convenience, elements having similar characteristics have been labeled with similar reference numerals.

Figure 8:
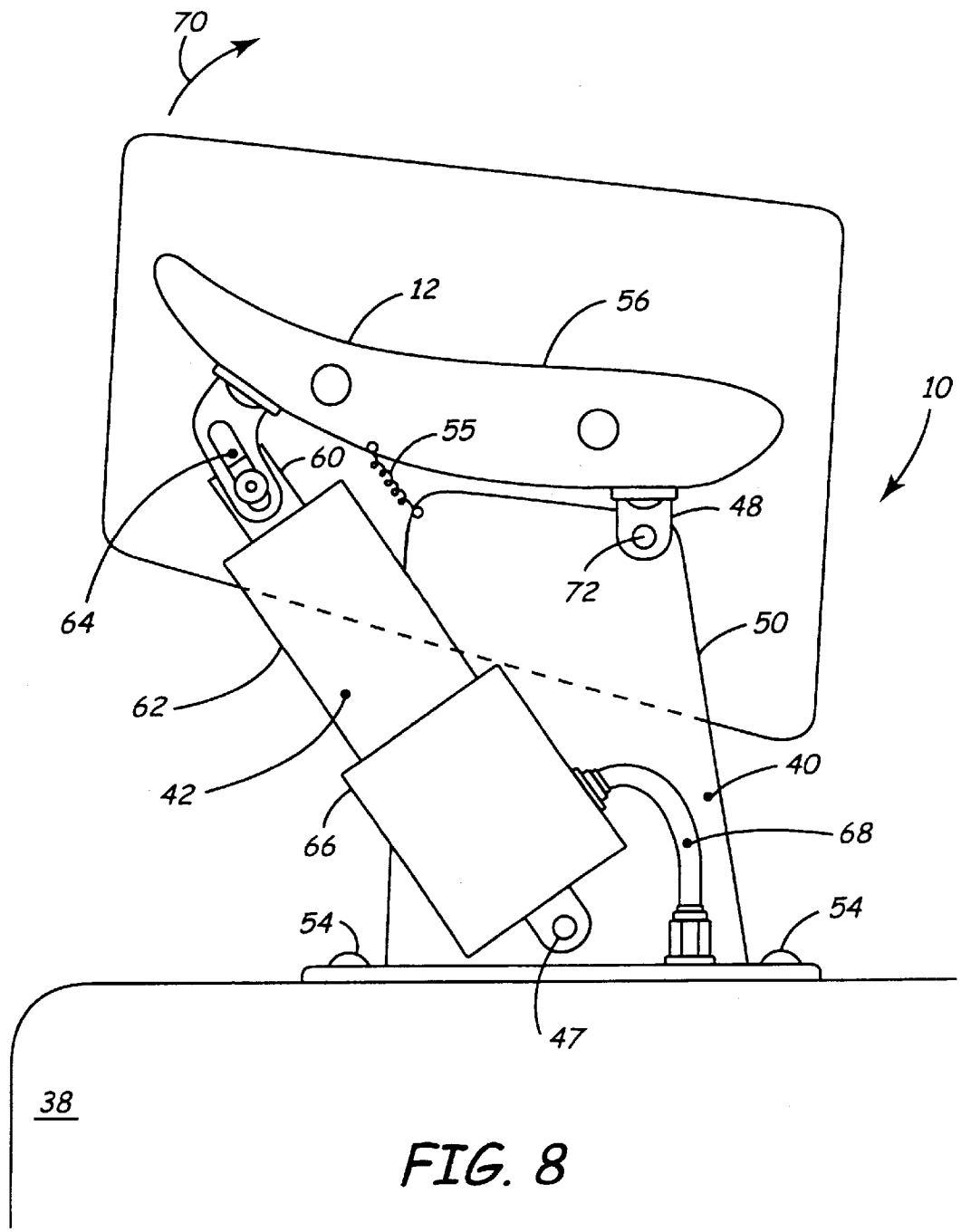
FIG. 8 is a sectional view of the adjustable airfoil taken along line 8—8 in FIG. 6.

In one embodiment of the present invention, adjustable airfoil 12 includes a spring system, schematically shown at 55 in FIG. 8, that is biased towards moving adjustable airfoil 12 from the airbrake pitch angle position (FIGS. 3 and 4) to the spoiler pitch angle position (FIGS. 2 and 5) upon the termination of a brake operation. In another embodiment, adjustable airfoil 12 receives electrical power from vehicle 11 through any of many electrical connection points other than brake light 18. As an example, FIG. 1 shows cigarette lighter power source 28 which includes an electrical connection 26 that joins electrical connection 24 and provides electrical power from vehicle 11 to remote control device 16 and device controller 14. It should be noted that electrical connection 24 may include multiple wires for transferring signals from remote control device 16 and transferring power from the electrical system of vehicle 11. Electrical connection 26 can be used by remote control device 16 to obtain power for operating an electronic display, such as a digital display. Electrical power, after being received by device controller 14 through electrical connection 24, can be transferred through electrical connection 22 to adjustable airfoil 12 where it can be utilized to change the configuration of the adjustable airfoil regardless of the operation status of the vehicle brake system.

FIGS. 2 and 5 illustrate embodiments of vehicle 11 wherein adjustable airfoil 12 has been set at a selected spoiler pitch angle position. In accordance with one embodiment of the present invention, the precise configuration of the spoiler pitch angle depends on an input value that is manually selected through the use of remote control device 16 and corresponds to a specific manually selected pitch angle setting for the spoiler pitch angle position.

Figure 12:
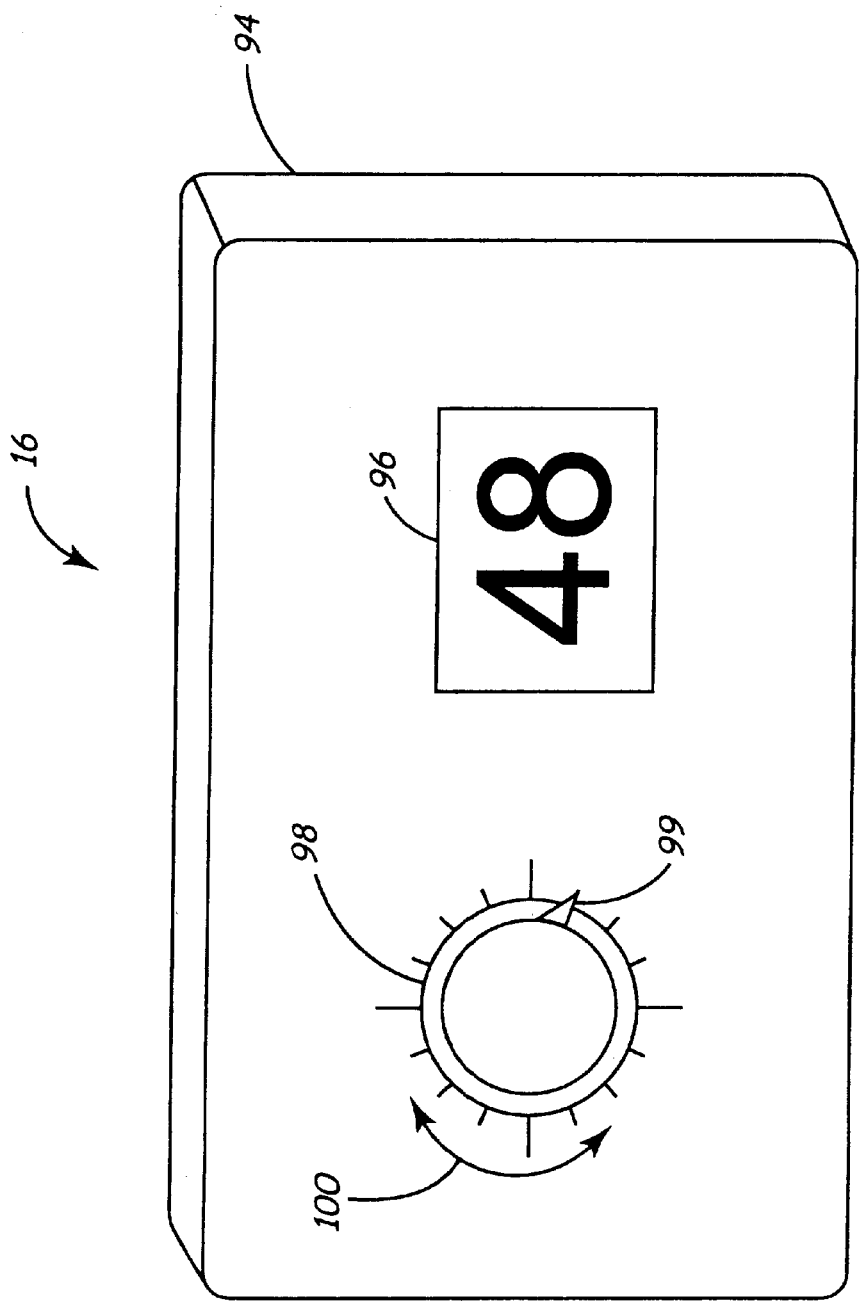
FIG. 12 is a perspective view of a remote control device.

FIG. 12 illustrates one embodiment of remote control device 16 that includes a housing 94, control knob 98 and display 96. In accordance with the embodiment, control knob 98 is turnable and includes a pointer portion 99 that is configured to indicate different potential pitch angle input values among optional pitch angle calibration markings 100. Display 96 displays an approximate numerical indication of the pitch angles emphasized by pointer portion 99. Optional calibration markings 100 correspond to the variety of pitch angles that adjustable airfoil 12 is capable of maintaining and in an embodiment not illustrated, optional calibration markings 100 include numerical indications of angle values. It is to be understood that the remote control device 16 illustrated by FIG. 12 is but an example of the many types of input devices that could be incorporated into the present invention without departing from the scope of invention. Any combination of digital, analog or mechanical input devices and displays could be incorporated into the above described remote control device 16. Likewise, the input value can comprise an analog signal, a digital signal, or any combination thereof.

In FIG. 2, adjustable airfoil 12 is illustrated in a configuration in which the major surface of the airfoil is substantially parallel to the ground. By manually entering a different input value into remote control device 16, the major surface of adjustable airfoil 12 is caused to rotate until a pitch angle that corresponds to the new input value is achieved. When the manually selected pitch angle is achieved, that angle is maintained and that adjustable airfoil configuration becomes the spoiler pitch angle position. In one embodiment of the present invention, the pitch angle of the adjustable airfoil cannot be changed through use of a remote control device, but can be changed through the adjustment of an adjustable connection of components that are an integral part of the airfoil. This embodiment will be described in more detail below. In another embodiment of the present invention, the pitch angle associated with the spoiler pitch angle position is selected by the airfoil manufacturer and cannot be adjusted manually.

In accordance with the present invention, adjustable airfoil 12, in response to an operation of the brake system within vehicle 11, automatically moves from the spoiler pitch angle position illustrated in FIGS. 2 and 5 to the air brake pitch angle position illustrated in FIGS. 3 and 4. When the operation of the brake system has been terminated, adjustable airfoil 12 moves from the air brake pitch angle position back to the spoiler pitch angle position. FIG. 6 illustrates an adjustable airfoil 12 in a spoiler pitch angle position. Adjustable airfoil 12 is attached to a vehicle trunk portion 38 by means of mounting members 40. Actuator 42 is connected to mounting member 40 and adjustable airfoil 12. FIG. 7 illustrates adjustable airfoil 12 after actuator 42 has received an instruction corresponding to an operation of a vehicle brake system and has reconfigured adjustable airfoil 12 to an air brake pitch angle position. FIG. 6 illustrates the position to which actuator 42 reconfigures adjustable airfoil 12 after the brake system operation has been terminated.

FIG. 8 is a sectional view of an adjustable airfoil system 10. Within the embodiment, mounting member 40 includes a connector 48 and a bottom segment 50. Bottom segment 50 is fixedly mounted to a vehicle trunk portion 38 utilizing bolts 54, while connector 48 is connected to an airfoil portion 56 and connected to bottom segment 50, with at least one of the connections being a pivotal connection. In another embodiment of the present invention, mounting member 40 is comprised of a single piece, the bottom of which fixedly mounts to a vehicle trunk portion, and the top of which pivotally connects directly to an airfoil portion. In the illustrated embodiment, actuator 42 includes a first actuator portion 60 that is movable relative to a second actuator portion 62. Actuator portion 60 is connected to airfoil portion 56 by means of adjustable components 64. Actuator portion 62 includes a motor portion 66 that is pivotally connected to mounting member 40 at pivot point 47. Actuator motor portion 66 may include a device controller or may be connected to a device controller through cord connection 68. Actuator 42 receives information and/or power from a connection to the vehicle brake system, a remote control device and, optionally, a vehicle power connection, though cord connection 68 as described above.

In one method of operation, a spoiler pitch angle position is first selected for adjustable airfoil 12. In one embodiment, the spoiler pitch angle position is selected by manually adjusting adjustable components 64 to a desired position. In another embodiment, an input value manually entered by a vehicle passenger and relating to a desired pitch angle is relayed from a remote control device through cord connection 68 and to motor portion 66 of actuator 42. In accordance with the manually selected input value, motor portion 66 causes actuator portion 60 to extend and move in relation to actuator portion 62, thereby causing a rotation of airfoil portion 56 in the direction of arrow 70 about pivot point 72 until adjustable airfoil 12 obtains the manually selected input value. The angle in accordance with the input value set on the remote control device becomes the spoiler pitch angle position.

In another embodiment of the inventive method, the adjustable airfoil system 10 does not include adjustable components 64 and instead, actuator portion 60 is directly connected to airfoil portion 56 of adjustable airfoil 12 and remote control device 16, the only manual means of adjusting the spoiler pitch angle, is utilized for adjustment. In accordance with another embodiment, adjustable airfoil system 10 does not include a remote control device nor adjustable components for manually adjusting the spoiler pitch angle position. In other words, the spoiler pitch angle position is not adjustable and the adjustable spoiler operates only at a spoiler pitch angle set by the manufacturer of the airfoil. In accordance with yet another embodiment of adjustable airfoil system 10, adjustable components 64 are the only device for manually adjusting the spoiler pitch angle and are utilized for adjustment.

In accordance with the method of the present invention, the pitch angle of adjustable airfoil 12 is changed from a first pitch angle, be it set by adjustable component 64, a remote control device, or by the airfoil manufacturer, to an air brake pitch angle in response to an operation of a brake system. Then, upon communication of a termination of the operation of the brake system of the vehicle through cord connection 68, the pitch angle of adjustable airfoil 12 is changed by actuator 42 from an air brake pitch angle position to the spoiler pitch angle position.

In one embodiment of the present invention, the actuator portion 62, which includes actuator motor portion 66, is pivotally connected to a trunk portion of a vehicle rather than being connected to a mounting member.

Figures 9, 10:
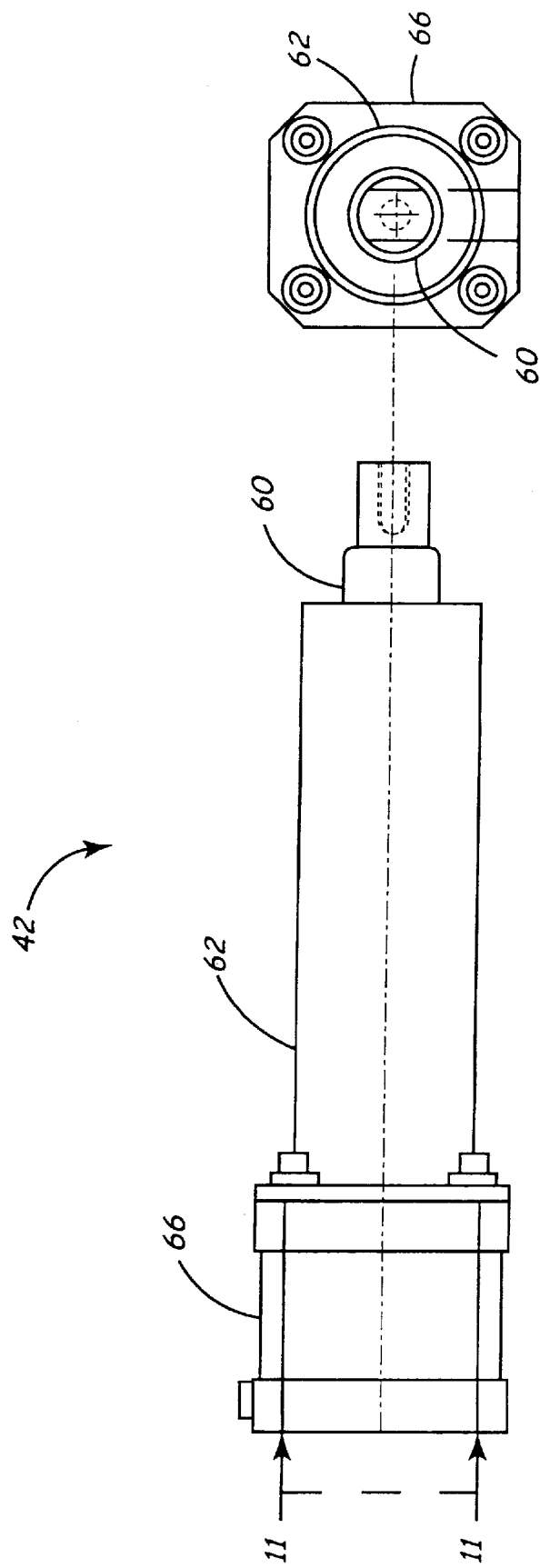
FIG. 9 is a side elevational view of an actuator device.
FIG. 10 is a front elevational view of the actuator device.

FIGS. 9 and 10 illustrate an exemplary actuator 42, which can be incorporated into the present invention. Actuator 42 includes actuator portion 60 which is extendable and movable in relation to actuator portion 62. A motor portion 66 is attached to and integral with actuator portion 62. The motor within motor portion 66, upon receiving instructions pertaining to a change in the adjustable airfoil configuration, initiates an appropriate and corresponding extension or retraction of actuator portion 60 relative to actuator portion 62. The precise mechanics utilized by motor portion 66 to extend and retract actuator portion 60 might include but are not limited to a screw drive, a hydraulic drive, a solenoid or a pneumatic drive.

Figure 11:
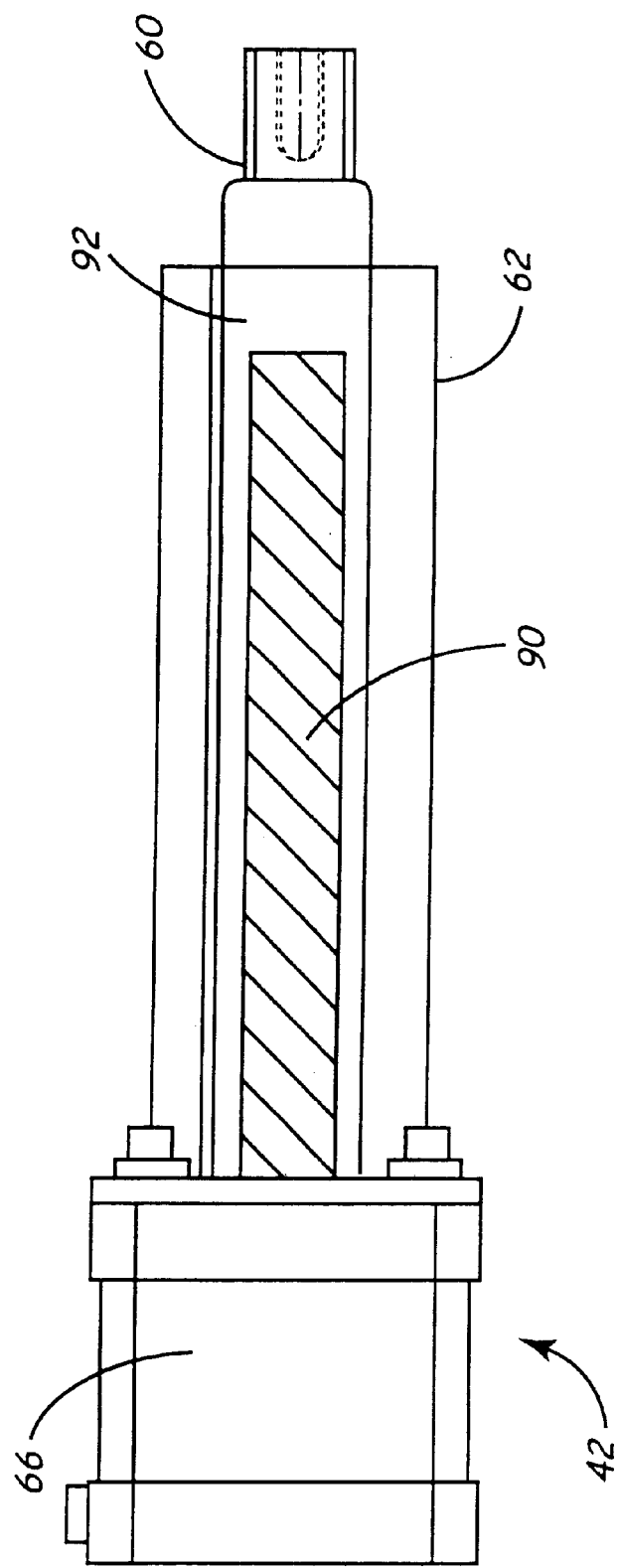
FIG. 11 is a sectional view of the actuator taken along line 11—11 of FIG. 9.

FIG. 11 illustrates an embodiment of actuator 42 in which a screw drive mechanism is incorporated. Actuator 42 includes a motor portion 66 that receives instructions pertaining to an extension or retraction of actuator portion 60 relative to actuator portion 62. Upon receiving an instruction to extend or retract actuator portion 60, the motor within motor portion 66 turns threaded section 90 causing thread jacket 92 to move correspondingly up or down the threaded section 90, thereby extending or retracting actuator portion 60.

Figure 13:
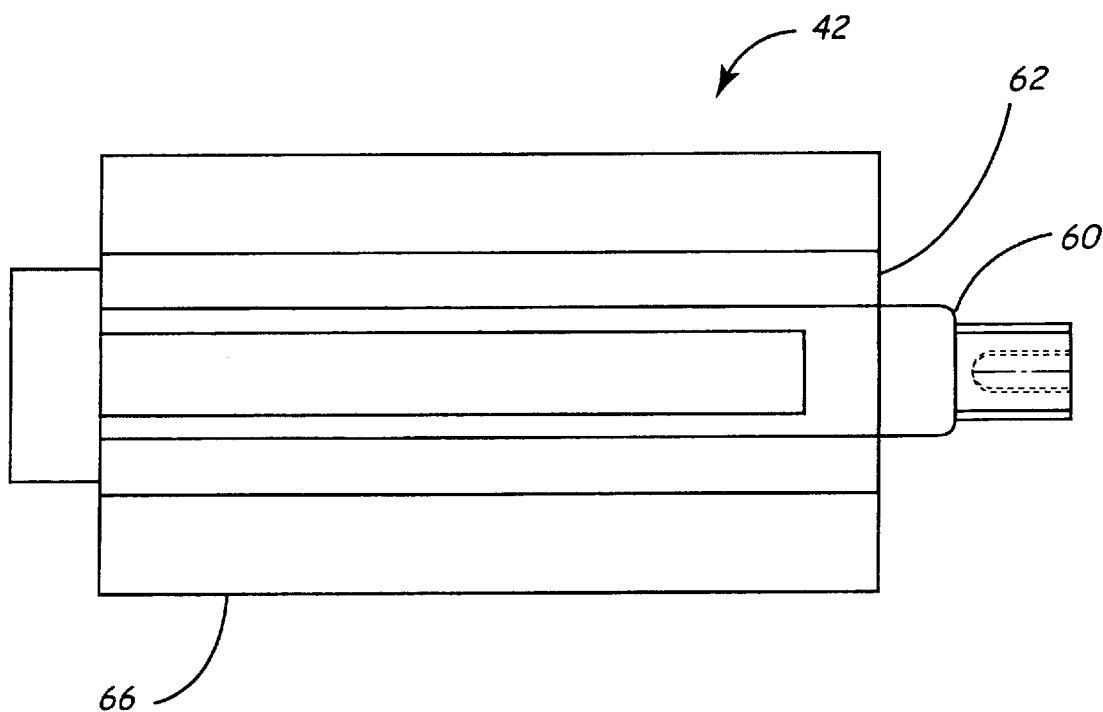
FIG. 13 is a side elevational view of an embodiment of the actuator device that incorporates a solenoid device.

FIG. 13 illustrates an embodiment of actuator 42 in which a solenoid drive mechanism is incorporated. Actuator 42 includes a motor portion 66 that contains an electromagnetic motor that receives instructions pertaining to an extension or retraction of actuator portion 60 relative to actuator portion 62. Upon receiving an instruction to extend or retract actuator portion 60, the electromagnetic motor within motor portion 66 operates a solenoid device in a known manner to extend or retract actuator portion 60 relative to actuator portion 62.

Although the present invention has been described with reference to illustrative embodiments, workers skilled in the art will recognize that changes may be made in form and detail without departing from the spirit and scope of the invention.

What is claimed is:

1. An automotive airfoil system mountable to a vehicle, comprising:

an adjustable airfoil mountable to the vehicle and movable from a first position to a second position;

a mounting member that includes a connector pivotally attached to a bottom segment, the connector being connected to the adjustable airfoil and the bottom segment being mountable to the vehicle;

an actuator device coupled to the adjustable airfoil to selectively move the airfoil from the first position to the second position and operatively coupled to a vehicle brake system so that the actuator device is able to receive a signal pertaining to operation of the vehicle brake system, wherein the actuator device moves the adjustable airfoil from the first position to the second position as a function of said signal, and wherein the actuator device includes first and second portions, the first portion being movable relative to the second portion, the first portion being connected to the adjustable airfoil and the second portion being connected to the mounting member;

a remote control device operably coupled to the actuator device to provide a second signal, wherein the actuator device moves the adjustable airfoil as a function of the second signal to any of a plurality of potential positions, and wherein the first position corresponds to an operator-selected one of the plurality of potential positions.

2. The automotive airfoil system of claim 1, wherein said actuator device further includes a motor having an input for receiving said signal pertaining to operation of the vehicle brake system, and wherein the motor operates said actuator device as a function of said signal.

3. The automotive airfoil system of claim 2, wherein said actuator device further includes an input for receiving power from the vehicle.

4. A method of operation for an adjustable airfoil for a vehicle, comprising:

changing a pitch angle of the adjustable airfoil in response to an operation of a brake system of the vehicle, said changing further comprising changing from a first pitch angle to an airbrake pitch angle wherein the adjustable airfoil is positioned substantially perpendicular to the vehicle; and, subsequently changing the pitch angle from the airbrake pitch angle to the first pitch angle in response to a termination of the operation of the brake system of the vehicle, wherein the first pitch angle is a selected angle that is selected by manually adjusting the adjustable airfoil.

5. The method of claim 4, wherein manually adjusting the adjustable airfoil is accomplished by the manual adjustment of an adjustable connection of components of the adjustable airfoil.

6. The method of claim 4, wherein manually adjusting the adjustable airfoil is a step performed by a passenger of the vehicle through the use of a remote control pitch angle selector located in a passenger compartment of the vehicle.

7. An automotive airfoil system mountable to a vehicle, comprising:

an adjustable airfoil mountable to the vehicle and movable from a first position to a second position;

a mounting member that includes a connector attached to a bottom segment, the connector being pivotally connected to the adjustable airfoil and the bottom segment being mountable to the vehicle;

an actuator device coupled to the adjustable airfoil to selectively move the airfoil from the first position to the second position and operatively coupled to a vehicle brake system so that the actuator device is able to receive a signal pertaining to operation of the vehicle brake system, wherein the actuator device moves the adjustable airfoil from the first position to the second position as a function of said signal, and wherein the actuator device includes first and second portions, the first portion being movable relative to the second portion, the first portion being connected to the adjustable airfoil and the second portion being connected to the mounting member;

a remote control device operably coupled to the actuator device to provide a second signal, wherein the actuator device moves the adjustable airfoil as a function of the second signal to any of a plurality of potential positions, and wherein the first position corresponds to an operator-selected one of the plurality of potential positions.

* * * * *

UNITED STATES PATENT AND TRADEMARK OFFICE
CERTIFICATE OF CORRECTION

PATENT NO. : 6,565,145 B2
DATED : May 20, 2003
INVENTOR(S) : Pettey

It is certified that error appears in the above-identified patent and that said Letters Patent is hereby corrected as shown below:

Title page,
Item [73], Assignee, "BTR Robotic Limited" should be -- BTR Robotics Limited Liability Company --

Signed and Sealed this

Twenty-second Day of March, 2005

JON W. DUDAS
*Director of the United States Patent and Trademark Office*